(No Model.)
W. VOGT.
ICE CREAM FREEZER.
No. 518,829. Patented Apr. 24, 1894.
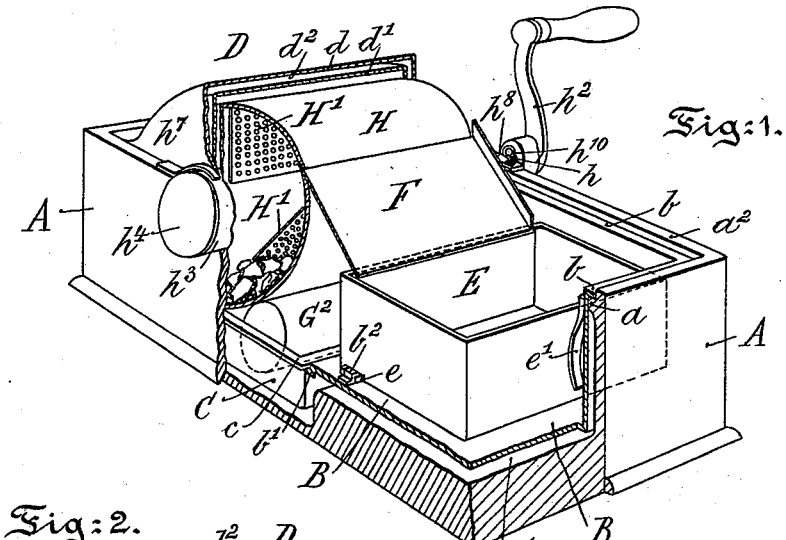
Fig. 1.
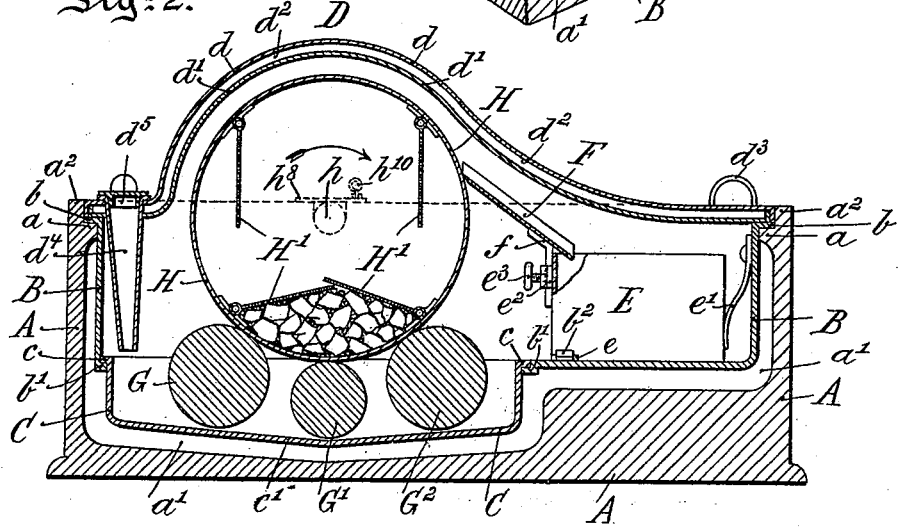
Fig. 2.
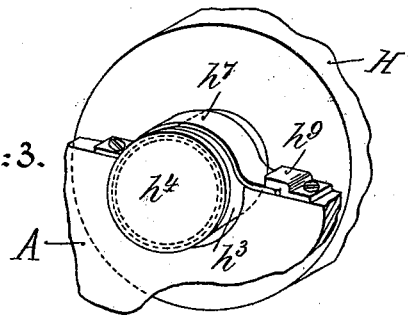
Fig. 3.   Fig. 4.
Fig. 5.
Witnesses:
Richard C. Maxwell
Louis Winterberger
Inventor:
Wilhelm Vogt,
By J. Walter Douglass.
Attorney.
THE NATIONAL LITHOGRAPHING COMPANY,
WASHINGTON, D. C.

UNITED STATES PATENT OFFICE.

WILHELM VOGT, OF PHILADELPHIA, PENNSYLVANIA, ASSIGNOR TO GEORGE H. HOLGATE, OF SAME PLACE.

ICE-CREAM FREEZER.

SPECIFICATION forming part of Letters Patent No. 518,829, dated April 24, 1894.

Application filed December 20, 1893. Serial No. 494,156. (No model.)

*To all whom it may concern:*

Be it known that I, WILHELM VOGT, a subject of the Emperor of Germany, but now residing at the city of Philadelphia, in the county of Philadelphia and State of Pennsylvania, have invented certain new and useful Improvements in Ice-Cream Freezers, of which the following is a specification.

My invention has relation in general to ice cream freezers; and more particularly to the construction and arrangement thereof.

My invention stated in general terms, comprises an ice cream freezer provided with a cream receptacle having rolls journaled thereto and contacting with a rotatable drum so that the cream may be frozen on the exterior surface thereof and be discharged into a receptacle through the intervention of a deliverer detachably connected therewith and the said receptacle supported by a spring to required position; and my invention further consists of the improvements hereinafter described and claimed.

The nature and general features of my invention will be more fully understood from the following description taken in connection with the accompanying drawings forming part hereof, in which—

Figure 1, is a perspective view and partial section of an ice cream freezer embodying the characteristic features of my invention. Fig. 2, is a central longitudinal section through the machine of Fig. 1. Fig. 3, is a perspective view of one portion of the rotatable drum, showing the hollow bearing at one end thereof provided with a removable cap for the introduction of the refrigerating matter into the interior of the drum and also showing means for detachably clamping the hollow end bearing to position in contact with one edge of the exterior shell or casing of the machine. Fig. 4, is a central sectional view of one of the journals of the drum, which on one side is hollow to constitute an inlet for introducing the refrigerating matter into the interior thereof and provided with tapering feathers engaged by clips or staples secured to one of the surfaces of a cap; and Fig. 5, is a perspective view of a form of cap provided with clips or staples for engaging the feathers formed on the interior surface of the hollow end journal of the drum of Fig. 4.

Referring to the drawings; A is the exterior shell or rectangular casing composed of wood or other suitable material provided with internal lugs or projections $a$, near the top of the same and with a recess $a'$, in the bottom thereof, and the rear end of the shell or casing A, provided with an upwardly projecting lip $a^2$, for a purpose to be presently explained.

B, is a casing with a top flange or rim $b$, adapted to seat with the lugs or projections $a$, of the shell or casing A, and having in the base a recessed rim $b'$, forming a seat for the reception of the complemental rim $c$, of a rectangular or other shaped receptacle C, with preferably an oppositely inclined bottom $c'$, to the center thereof.

D, is a cover of preferably the form shown in Fig. 1, and provided with top and bottom walls $d$ and $d'$, with an air space or jacket $d^2$, between them and provided with a handle $d^3$, and with a funnel shaped hopper $d^4$, extending downward through said cover and supported to position thereby and with a removable internally flanged cap or cover $d^5$. The rear end of the cover D, engages between the projection $a$, and the lip $a^2$, and the opposite end is seated to the projection of the internal case B.

E, is a receptacle or box provided with a base lug $e$, adapted to engage with a clip or catch $b^2$, secured to and projecting from the casing B.

$e'$, is a leaf or other spring secured to one end wall of the casing B, and adapted to normally press against one of the walls of the box or receptacle E, and to the opposite end wall of the receptacle E, is secured a clamp $e^2$, provided with a tightening screw $e^3$.

F, is an inclined deliverer or scraper provided with a depending rest or arm $f$, adjustably engaging the clamp $e^2$, and secured to required position by means of the screw $e^3$.

G, G' and G², are a series of rolls preferably of different diameters and provided with end journals secured in the side walls of the receptacle B, for cream or the like and frictionally contacting with the surface of the drum H, and the said rolls adapted to lift the cream or the like into contact with the peripheral surface of the drum. The drum H, is provided at the right hand end with a journal $h$, engaging in a recessed bearing $h'$, formed in the top edge of the side wall of the shell or casing A, and having a detachable hand crank $h^2$, applied thereto. The opposite end of the drum H, is provided with a hollow journal $h^3$, and with a movable cap $h^4$, having on one surface thereof catches or clips $h^5$, as illustrated in Fig. 5, and adapted to engage with tapering lugs or feathers $h^6$, formed preferably integral with the internal surface of the hollow journal $h^3$.

$h^7$ and $h^8$, are flanged clips or catches secured to the edges of the exterior shell or casing A, and adapted to be engaged by clamping devices $h^9$ and $h^{10}$, secured to the top edges of the side walls of the shell or casing A, and conforming to the contour of the respective journals of the drum H. The drum H, on the interior thereof is provided with a series of depending swinging or vibrating perforated wings or vanes H', for confining the refrigerating matter to a greater or less extent packed in the drum H, through the hollow journal $h^3$, and also for conducting any fluid accumulating away from the wall of the drum toward the axis thereof and thus securing the most beneficial results in the instantaneous freezing of the cream or the like lifted by the series of rolls G, G' and G$^2$, into contact with the peripheral surface of the drum H.

It should be borne in mind that the drum H, is to be packed with the refrigerating matter between the perforated vanes or wings H', and so that they project at angles therefrom, and toward the axis in the rotation of the drum.

The mode of operation of the machine hereinbefore described, is as follows:—The cylinder is first thoroughly packed with refrigerating matter, such as ice and salt, with the series of internal or vibrating wings or vanes H', extending outward from the internal surface of the drum H, and so as to occupy positions respectively tending to the axis of the drum. The cap is then secured to position in contact with the hollow end journal of the drum and the same is then caused to assume the position, for example, as illustrated in Figs. 1 and 2. The cover D, is then placed in position and the clamping devices adapted to engage with the end journals of the drum secured to the clips $h^7$ and $h^8$, and the hand crank $h^2$, is secured to the right hand journal of the drum H. The receptacle E, is then placed in position so that the inclined deliverer or scraper F, will contact with the peripheral surface of the drum, as illustrated for example in Figs. 1 and 2. The respective rolls mounted in the cream or like receptacle C, will frictionally contact with the surface of the drum, and by turning the hand crank $h^2$, the drum will be rapidly rotated and in the rotation of said drum the series of wheels G, G' and G$^2$, will be rotated therewith in the cream receptacle C, thereby lifting the same into contact with the surface of the drum maintained by the refrigerating matter in the interior thereof, far below the freezing point and causing thereby through contact of the lifted cream or the like with the peripheral surface of the drum, the same to be instantaneously frozen and delivered from the peripheral surface by means of the inclined deliverer or scraper F, into the receptacle E, as frozen cream or the like.

It may be here remarked that the cream to be frozen is deposited in the receptacle C, through the funnel shaped hopper $d^4$, by removing the flanged cap thereof; and moreover, that the freezing of the cream is continuous and instantaneous, that is to say, after the drum has been brought to a freezing temperature by the internal contents thereof, it will be maintained in that condition until such matter has melted and during the maintenance of the drum below the freezing point, as the cream is lifted by the series of rolls G, G' and G$^2$, the same will be instantly transformed to a frozen state and delivered therefrom by the scraper F, adjustably engaging the drum, into the receptacle E, for use.

It will be observed by reference to Figs. 1 and 2, that an air space is provided between the external shell or casing A, and the internal casing B, whereby an air jacket is formed and also that an air space is formed between the double walled cover for a similar purpose, so that the internal portion or parts of the apparatus as illustrated, will be maintained at substantially a uniform temperature unaffected by the surrounding atmosphere, and thus most beneficial results will be obtained in the instantaneous freezing of the cream or the like by contact of the same with the surface of the drum H.

Having thus described the nature and objects of my invention, what I claim as new, and desire to secure by Letters Patent, is—

1. An ice cream freezer provided with a drum having internal movable wings or vanes adapted to support refrigerating matter, and means for rotating said drum, substantially as and for the purposes set forth.

2. In an ice cream freezer, a drum provided with internal perforated pivoted vanes or wings and means for rotating said drum, substantially as and for the purposes set forth.

3. An ice cream freezer provided with a cream receptacle with an oppositely inclined bottom, rolls of different diameters journaled to said receptacle, a rotatable drum contacting with said rolls and in the rotation thereof adapted to permit of the discharge of frozen cream or the like therefrom, substantially as and for the purposes set forth.

In testimony whereof I have hereunto set my signature in the presence of two subscribing witnesses.

WILHELM VOGT.

Witnesses:
  GEO. W. REED,
  THOMAS M. SMITH.